United States Patent Office 3,082,226
Patented Mar. 19, 1963

3,082,226
THIOCOLCHICINE DERIVATIVES
Hans-Peter Sigg, Binningen, Baselland, Switzerland, assignor to Sandoz Ltd., Basel, Switzerland, a Swiss firm
No Drawing. Filed July 25, 1960, Ser. No. 44,866
Claims priority, application Switzerland Aug. 3, 1959
6 Claims. (Cl. 260—399)

The present invention relates to novel thiocolchicine compounds and to a method for their manufacture, said compounds having the formula

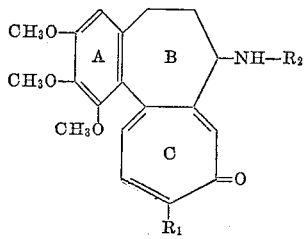

I wherein $R_1$ is a lower alkyl mercapto radical (e.g., methyl mercapto, ethyl mercapto, propyl mercapto, butyl mercapto, isobutyl mercapto, etc.) and $R_2$ is carboxylic acyl radical of the aliphatic or substituted aromatic series having at least 9 carbon atoms and preferably not more than 24 carbon atoms, for example, undecanoyl, laurinyl, stearoyl, oleyl, linoleoyl, palmitoyl, ricinoleoyl, arichidonoyl, lignoceroyl, and clupadonoyl in the aliphatic series and trimethyl galloyl, p-phenyl benzoyl, p-cyclohexyl benzoyl, beta naphthoyl and alpha naphthoyl, in the substituted aromatic series.

GENERAL METHOD OF PREPARATION

To prepare the novel thiocolchicine compounds of the present invention in accordance with Formula I above, acylation is carried out in an inert solvent with a starting desacetyl colchicine compound of Formula II below

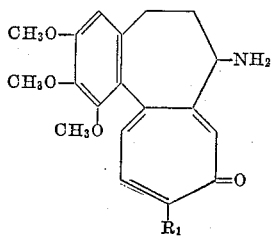

II in which $R_1$ is a lower alkyl mercapto radical of the same definition as in Formula I, said acylation being carried out in said inert solvent with a reactive carboxylic acylating compound having at least 9 carbon atoms in the acyl group, such as aliphatic carboxylic acyl chloride or a substituted aromatic carboxylic acyl chloride whereby the resulting acylamine derivative is recovered in purified form from the reaction mixture by chromatography or by crystallization or by freeze drying. The reactive carboxylic acyl compound which reacts with the primary amine radical in ring B of the desacetyl colchicine compound may include aliphatic carboxylic acid chlorides, bromides or iodides having more than 9 carbon atoms such as for example, the acid chloride of saturated fatty acids, e.g. lauric acid, palmitic acid, stearic acid, lignoceric acid or of unsaturated fatty acids, e.g., lauroleic acid, oleic acid, erucic acid, linoleic acid, ricinoleic acid, arachidonic acid, clupanodonic acid or of substituted aromatic acids, e.g., trimethyl gallic acid, p-phenyl benzoic acid, p-cyclohexyl benzoic acid, beta naphthoic acid, alpha naphthoic acid, etc.

ILLUSTRATIVE METHOD OF PREPARATION

An illustrative method of preparation of the novel thiocolchicine compounds of the invention is as follows:

The amine of Formula II is dissolved in dry pyridine and this solution is treated with from 1.2 to 1.5 equivalents of the selected carboxylic acid chloride of the aliphatic or substituted aromatic series, the reaction being carried out at room temperature (e.g. about 20–30° C.) for 24–48 hours in the absence of light. The reaction mixture is then diluted with dry methylene chloride or other chlorinated aliphatic hydrocarbon solvent (for example, chloroform, ethylene chloride, etc.) and the organic phase containing the reaction product is washed first with dilute aqueous acid, e.g., hydrochloric acid, then with dilute aqueous alkali, e.g., sodium hydroxide and then the volatile solvent is evaporated to recover the crude reaction product.

The crude reaction product residue is then purified. One method of purification which is used is by recrystallization from a suitable selected organic solvent or from an organic solvent mixture; such as, for example, benzene, diethyl ether, 1:1 benzene-ether mixture, etc. The crude residue may be dissolved in these solvents and then may be purified by chromatographic separation on an aluminum oxide column following the known technique for this separation and purification. The recrystallization and chromatography purification procedures are selected for recovery of crystalline solid purified products and are employed in instances where the crystalline nature of the final product is apparent from earlier runs or from inspection of the crude residue recovered after washing and evaporation. In instances where the final product is amorphous rather than crystalline, the amorphous crude reaction residue may be purified by dissolving in suitable solvent, e.g., benzene and the purified product precipitated by freeze drying whereby the pure product is recovered in a solid amorphous state.

The pure novel compounds of the invention under Formula I above exist in the form of crystalline or amorphous solids at room temperature, these solid substances being readily soluble in polar organic solvents, for example, in chloroform, methylene chloride, lower alcohols (methanol, propanol, ethanol, etc.) and only slightly soluble in non-polar organic solvents such as diethyl ether, petroleum ether and being insoluble in water. The infra-red spectrum of the compounds exhibits the characteristic absorption band for the carboxylic acid amide linkage at 1670–1675 reciprocal centimeters (in methylene chloride solvents). The purity of the compounds may be demonstrated following known paper chromatography methods.

UTILITY

The thiocolchicine compound of Formula I are distinguished by structure and pharmacological activity over the parent colchicine structure to provide new and unobvious advantages. As a result of substitution in the C ring of thiomercapto radical in place of methoxyl in the parent colchicine structure and as a result of the substitution of at least $C_9$ acyl at the amino nitrogen substituent in the B ring of the parent colchicine structure there has been discovered a remarkable and beneficial modification of the fundamental pharmacological properties of the parent colchicine molecule.

In contrast to the side effects of nausea, vomiting, abdominal pain and diarrhea which are so characteristic of colchicine, these effects are not observed and are absent upon administration of the compounds of the invention. Therapeutically effective dosages of these compounds of the invention in amounts of from ½ to 2 milligrams per kilogram of body weight by parenteral adminstration once a day for 10 days demonstrates no cytotoxicity in contrast to the cytotoxicity of colchicine, which as described at pages 305–307 of Goodman and Gilman "The Pharmacological Basis of Therapeutics,"

1955, MacMillan Company, is sufficiently cytotoxic to affect both normal cells and cancer cells, causing temporary leucopenia which is replaced by leucocytosis and striking increase in the number of basophilic granulocytes, harmful effect on bone marrow and possibility of agranulocytosis or aplastic anemia.

As set out in Goodman and Gilman at page 305, column 2, line 35, most available congeners of colchicine are less active than the parent compound and it is, therefore, indeed surprising to discover that the selective mitosis-arresting effect which is demonstrated for the compounds under Formula I herein is superior to that achieved with colchicine. In vitro with fibro-blast cultures at a concentration of 10-6.5 to 10-7 of the compound of the invention there is a complete arrest of the mitosis in the metaphase. In this same culture at ⅕ to ¹⁄₁₀ concentration of the metaphase arrest concentration there is a 50% of the growth resulting from mitosis.

In vivo tests in mice carried out with experimental mouse tumor and with Ehrlich's mouse ascites tumor demonstrated that single dosages of about ½-3 mg./kg. were very well tolerated, arrested cell mitosis for a period of from 20-40 hours. There were no side effects from such single dosage e.g., the usual side effects of nausea, vomiting, diarrhea, gastroenteritis, etc., characteristic of colchicine toxicity.

Intermittent and repeated administration of the compounds of the invention provides even better anti-mitotic arrest which is free from the toxic side effects characteristic of colchicine. Intermittent repeated dosages at a level of ½ to 2 mg./kg. daily administered parenterally to mice infected with Sarcoma 37 and Ehrlich's mouse ascites tumor arrested mitosis and contained these tumors. The life expectancy of mice infected with leukemia 1210 was demonstrated to be increased by 100%.

It is, therefore, seen that the compounds under Formula I herein are useful in the known areas of utility of colchicine itself, e.g., in the treatment of gout, gouty arthritis, as an experimental tool in the study of normal and pathological cell growth and affects thereon of carcinogens, hormones and other substances, in easing the treatment of acute and chronic leukemia in the form of an oil suspension for treating lesions of condylomata acuminatum. By virtue of their freedom from the intoxicating effects of colchicine the compounds of Formula I are more widely useful with improved assurance of avoiding gastrointestinal irritation, vascular damage, kidney damage, muscular depression and paralysis upon single dosage and agranulocytosis, peripheral neuritis or depilation on chronic administration. The compounds under Formula I are better given intravenously but may also be given intramuscularly or subcutaneously.

EXAMPLES

The preparation of the novel compounds and features of the novel method are illustrated in the following specific examples, these given by way of illustration and not for limitation, all of the temperature values in the examples are in degrees centigrade. The melting points are determined in evacuated capillary tubes and the values of melting points are uncorrected.

EXAMPLE 1

N-(Trimethyl-Galloyl)-Desacetyl-Thiocolchicine

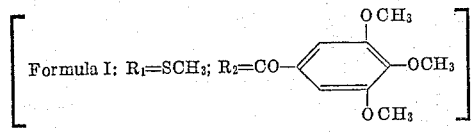

To a solution containing 250 milligrams of desacetyl thiocolchicine in 3 cubic centimeters of absolute pyridine was added the equivalent reacting amount of freshly distilled acyl chloride in the dark.

The so-treated solution was permitted to stand for 48 hours in the dark (absence of light) at room temperature (20° C.). After reaction for 48 hours in the absence of light at room temperature, the reaction mixture was diluted with 10 cubic centimeters of dry methylene chloride. The diluted organic phase in its entirety was then washed several times with 2-normal hydrochloric acid solution, then washed several times with 2-normal sodium carbonate solution and finally washed with water. The washed organic phase was then dried over anhydrous sodium sulfate and evaporated to dryness under vacuum.

Thus in this example, trimethyl gallic acid chloride is recited with desacetyl-thiocolchicine in pyridine and the above identified N-(trimethyl-galloyl)-desacetyl-thiocolchicine was recovered in pure form. Melting point 162–183° C. and decomposition at 285° C.; $[\alpha]_D^{23} = +38°$ (c.=1.006 in chloroform). IR: U.A. 1660 cm.$^{-1}$ (in methylene chloride and Nujol).

EXAMPLE 2

N-(Pelargonyl)-Desacetyl-Thiocolchicine

[Formula I: $R_1=SCH_3$; $R_2=CO-(CH_2)_7-CH_3$]

By following the procedure of Example 1 and using the same starting thiocolchicine material of Example 1, the above entitled compound of this example was prepared from pelargonic acid chloride. The crude reaction product was not crystallized and accordingly, the product was purified by taking up the residue chloroform, the chloroform solution was filtered through aluminum oxide, the filtrate was evaporated to dryness under vacuum and the residue was dissolved in benzene. The so purified benzene solution was subjected to freeze drying to recover a precipitate having $[\alpha]_D^{20} = -188°$ (c.=1.20 in chloroform). IR: U.A. 1675 cm.$^{-1}$ (in methylene chloride).

EXAMPLE 3

N-(Caprinyl)-Desacetyl-Thiocolchicine

[Formula I: $R_1=SCH_3$; $R_2=CO-(CH_2)_8-CH_3$]

By following the procedure of Example 1 and using the same thiocolchicine starting material of Example 1, the above entitled compound of this example was prepared from capric acid chloride. The crude as well as the purified reaction product were amorphous rather than crystalline. Accordingly, purification of the crude reaction product was carried out in accordance with the procedure described in Example 3. $[\alpha]_D^{22} = -172°$ (c.=1.50 in chloroform). IR: U.A. 1675 cm.$^{-1}$ (in methylene chloride).

EXAMPLE 4

N-(Undecanoyl)-Desacetyl-Thiocolchicine

[Formula I: $R_1=SCH_3$; $R_2=CO-(CH_2)_9-CH_3$]

By following the procedure of Example I and using the same thiocolchicine starting material of Example I, the above entitled compound of this example was prepared from undecanoic acid chloride. The crude as well as the purified reaction product were amorphous rather than crystalline. Accordingly, purification of the crude reaction product was carried out in accordance with the procedure described in Example 3.

$[\alpha]_D^{21} = -184.5°$ (c.=1.05 in chloroform). IR: U.A. 1670 cm.$^{-1}$ (in methylene chloride).

EXAMPLE 5

N-(Laurinyl)-Desacetyl-Thiocolchicine

[Formula I: $R_1=SCH_3$; $R_2=CO-(CH_2)_{10}-CH_3$]

By following the procedure of Example I and using the same thiocolchicine starting material of Example I, the above entitled compound of this example was prepared from lauric acid chloride. The crude as well as the purified reaction product were amorphous rather than crystalline. Accordingly, purification of the crude reaction product was carried out in accordance with the procedure described in Example 3. $[\alpha]_D^{21} = -190°$ (c.=0.94 in chloroform). IR: U.A. 1670 cm.$^{-1}$ (in methylene chloride).

In the procedure set out in Examples 2, 3, 4 and 5 above, the purification can be carried out by chromatography using a column of aluminum oxide which is conditioned with benzene-ether, the impure compounds being put in the column from benzene-ether and the pure compounds being eluted from the column with benzene.

Similarly, the N-acyl derivatives under Formula I may be prepared from the acid chloride, acid bromide or acid iodide of other substituted aromatic acids, e.g., p-cyclohexyl benzoic acid, p-phenyl benzoic acid or of other aliphatic fatty acids, oleic acid, stearic acid, linoleic acid, etc.

Although the starting thiocolchicine illustrated hereinabove contains mercapto-methyl group $R_1$, the invention embraces the thiocolchicine derivatives in which $R_1$ is ethyl mercapto, propyl mercapto, isopropyl mercapto and butyl mercapto.

If in the preceeding examples the methyl mercaptor group of desacetyl colchicine is replaced by another lower alkyl mercapto radical, such as an ethyl mercapto, propyl mercapto, isopropyl mercapto and butyl mercapto group, the corresponding thiocolchicine derivatives will be obtained.

Having thus disclosed the invention, I claim:
1. A compound of the formula

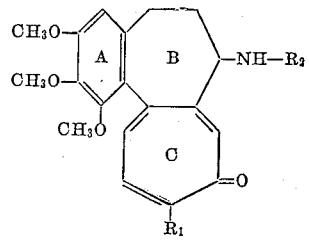

wherein $R_1$ is a lower alkyl mercapto radical and $R_2$ is carboxylic acyl radical having at least 9 carbon atoms and not more than 24 carbon atoms in the acyl group, said acyl radical selected from the group consisting of aliphatic acyl and hydrocarbon radical substituted aromatic acyl.

2. N-(trimethyl-galloyl)-desacetyl-thiocolchicine.
3. N-(pelargonyl)-desacetyl-thiocolchicine.
4. N-(caprinyl)-desacetyl-thiocolchicine.
5. N-(undecanoyl)-desacetyl-thiocolchicine.
6. N-(laurinyl)-desacetyl-thiocolchicine.

References Cited in the file of this patent
UNITED STATES PATENTS

| | | |
|---|---|---|
| 2,811,554 | Muller et al. | Oct. 29, 1957 |
| 2,820,029 | Muller et al. | Jan. 14, 1958 |

OTHER REFERENCES

Lettre: Angew. Chem. 63, 421–430 (1951).